United States Patent [19]

Kamke

[11] Patent Number: 5,075,015
[45] Date of Patent: Dec. 24, 1991

[54] METHOD FOR COLOR REMOVAL FROM THERMALLY CONDITIONED SLUDGE LIQUORS

[75] Inventor: Robert J. Kamke, Mount Holly, N.J.

[73] Assignee: Zimpro Passavant Environmental Systems, Inc., Rothschild, Wis.

[21] Appl. No.: 693,908

[22] Filed: May 1, 1991

[51] Int. Cl.⁵ ............................................... C02F 1/76
[52] U.S. Cl. ..................................... 210/754; 210/756; 210/765; 210/766; 210/917
[58] Field of Search ............... 210/609, 613, 631, 754, 210/756, 761, 765, 766, 917, 928

[56] References Cited

U.S. PATENT DOCUMENTS

| | | | |
|---|---|---|---|
| 3,272,739 | 9/1968 | Earle et al. | 210/63 |
| 3,272,740 | 9/1966 | Gitchel et al. | 210/12 X |
| 3,359,200 | 12/1967 | Gitchel et al. | 210/63 |
| 3,824,168 | 7/1974 | Erickson et al. | 210/7 |
| 4,609,469 | 9/1986 | Keoteklian | 210/609 |
| 4,626,354 | 12/1986 | Hoffman et al. | 210/603 |
| 4,983,258 | 1/1991 | Maxham | 210/928 |

Primary Examiner—Thomas Wyse
Attorney, Agent, or Firm—Tipton L. Randall

[57] ABSTRACT

A process for removing color and oxidizable organic matter from thermally conditioned sludge liquor is disclosed. The process comprises treating the liquor with 250 to 430 mg/l chlorine which removes 20 to 70 percent of the color and produces a chlorine residual in the liquor. The chlorine-treated liquor is mixed with a small volume of untreated thermal conditioning liquor to remove the chlorine residual, and the dechlorinated mixture is returned to the treatment plant influent for additional treatment.

7 Claims, 1 Drawing Sheet

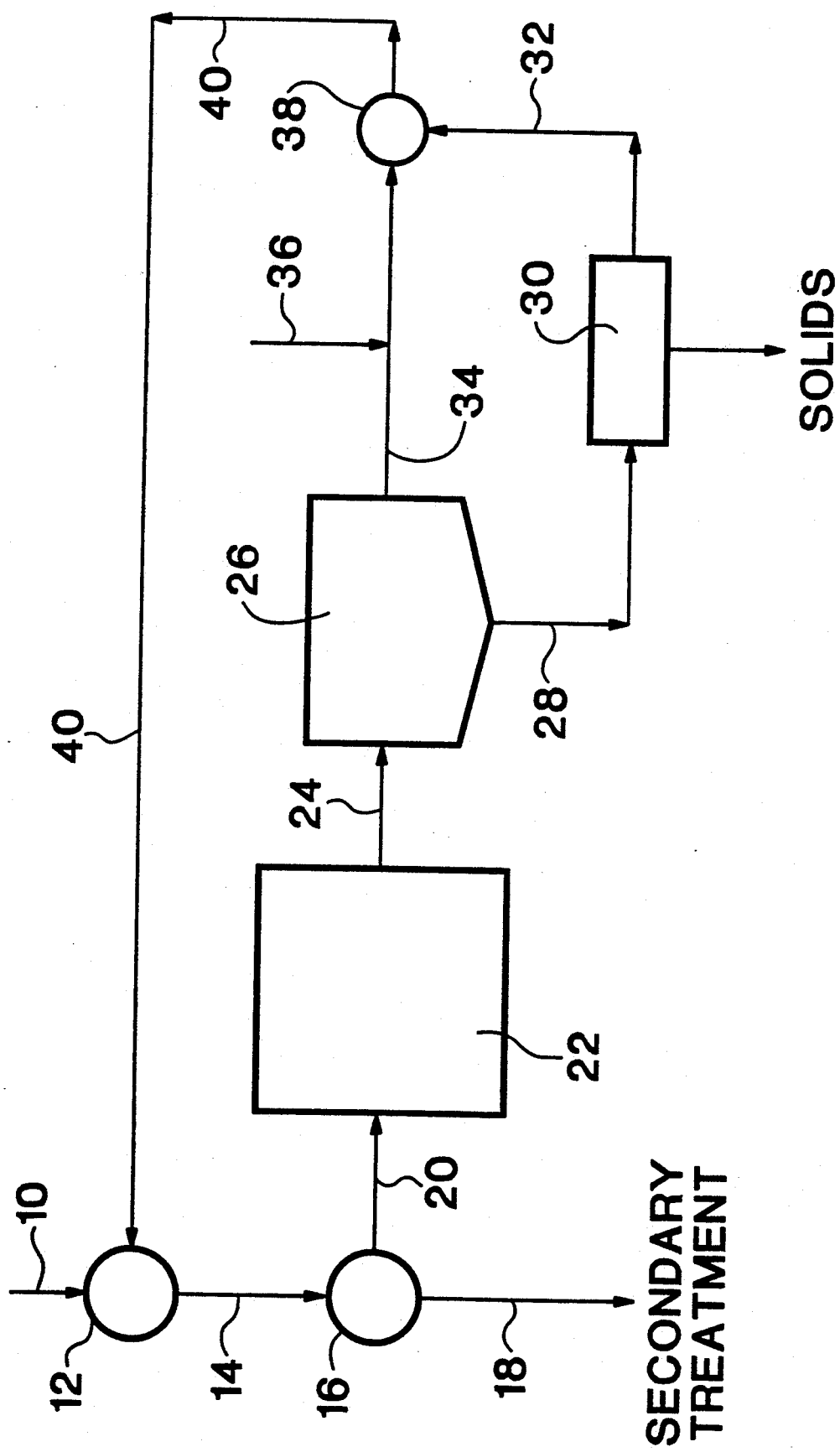
FIGURE

METHOD FOR COLOR REMOVAL FROM THERMALLY CONDITIONED SLUDGE LIQUORS

BACKGROUND OF THE INVENTION

1. Field of the Invention

This invention relates to the removal of color from organic waste liquor, and in particular is concerned with color removal from thermally conditioned sludge liquors.

2. Information Disclosure Statement

The liquor obtained in the dewatering of thermally conditioned organic sludge, especially sewage sludge, is generally a small volume stream of concentrated, highly colored material. The liquor to be treated is obtained by wet air oxidation of organic sludges by methods known in the art; cf. U.S. Pat. Nos. 3,272,739, 3,272,740 and 3,359,200. These liquors are generally treated by recycling them to the treatment plant influent for dilution with raw wastewater and subsequent biological or biophysical treatment within the system. The concentrated nature of these thermally conditioned liquors can put additional loading on the plant, in the form of organic components and color materials which require removal from the wastewater. Treatment plants often are required to meet specific discharge requirements with respect to effluent color, $BOD_5$, suspended solids, etc. If these limits are exceeded, stiff penalties are enforced.

Various treatment methods have been disclosed which remove the organic and/or color content of thermally conditioned sludge liquors. In U.S Pat. No. 3,874,168 Erickson et al. disclose a separate highly loaded biological treatment process to treat thermally conditioned sludge liquors. This process requires much additional hardware for operation.

U.S. Pat. No. 4,626,354 by Hoffman et al. discloses biophysical anaerobic treatment of thermally conditioned sludge liquor using a powdered adsorbent, such as activated carbon, within the anaerobic digester system. Once subjected to anaerobic digestion, the treated liquor is more amenable to color removal by adsorption with fresh powdered adsorbent. Again, a separate system is dedicated to treatment of thermally conditioned sludge liquors.

Applicant has discovered a simple treatment process which effectively removes a substantial portion of the color and organic constituents present in thermally conditioned sludge liquors with a minimum or additional equipment.

SUMMARY OF THE INVENTION

The invention comprises the steps of contacting thermally conditioned sludge liquor with sufficient chlorine to remove a substantial portion of the color from the liquor and produce a chlorine-treated thermally conditioned sludge liquor with a residual chlorine content therein. The treated liquor is then mixed with a small amount of additional thermally conditioned liquor to destroy the residual chlorine content of this mixture. The dechlorinated mixture is then returned to the influent of the plant for further treatment.

The thermally conditioned sludge liquor has a color in the range of 2,500 to 6,000 APHA color units and the chlorine dose to the thermally conditioned liquor ranges from 250 to 430 mg/l. The chlorine residual in the treated thermally conditioned sludge liquor ranges from 5 to 120 mg/l and the portion of color removed ranges from 20 to 70 percent.

BRIEF DESCRIPTION OF THE DRAWING

The Figure is a process flow sheet showing a system in which the instant invention is practiced.

DESCRIPTION OF THE PREFERRED EMBODIMENTS

The invention is an economical method for treatment of thermally conditioned sludge liquors to remove a substantial portion of the color therefrom. An overall flow sheet of a treatment plant using the invention is shown in the Figure.

Referring to the Figure, raw sewage from a conduit 10 enters an equalization tank 12. Raw sewage then flows via a conduit 14 to a clarifier 16 where settling of solids occurs. This is termed primary treatment of the wastewater. The clarified raw wastewater flows via a conduit 18 to secondary treatment in the system. The primary settled solids, or primary sludge, is difficult to dewater for disposal. The sludge is transferred via a conduit 20 to a thermal conditioning unit 22. Thermal conditioning treatment of the primary sludge renders the sludge easily dewaterable. Thermal conditioning is low pressure, low temperature wet oxidation which oxidizes a small fraction of the organic material in the sludge. The process is well known in wastewater treatment.

The thermally conditioned sludge flows via a conduit 24 to a clarifier 26 where solids settle and clarified thermally conditioned liquor overflows. The settled solids are transferred via a conduit 28 to dewatering and are dewatered by any conventional dewatering means 30 to provide a solid for disposal and a liquid in a conduit 32 which is recombined with the clarifier overflow contained in a conduit 34 and returned to the equalization tank 12 for recycle through the wastewater treatment system.

The thermally conditioned liquor and liquid from the dewatering operation are generally highly colored with a considerable concentration of organic matter. Although small in volume compared to the overall treatment plant flow, this recycle stream is an additional load on the treatment plant. The color material in the thermally conditioned liquor recycle stream may tax the ability of secondary treatment in its removal.

To overcome this problem, I have devised an economical method of color removal from the thermally conditioned sludge liquor which also removes portions of the organic components form the liquor. The method of this invention comprises dosing the thermally conditioned liquor with chlorine from a chlorine source 36 to remove color and produce a slight chlorine residual in the liquor. The treated thermally conditioned liquor is then mixed in a chamber 38 with a small amount of untreated thermally conditioned liquor to remove the chlorine residual. The resulting dechlorinated liquid is recycled via a conduit 40 to the equalization tank 12 for further treatment by the system. In the Figure, the chlorine is mixed with the thermally conditioned liquor from the clarifier and then liquid from the dewatering means is mixed with the treated liquor to remove any residual chlorine. The resulting dechlorinated thermally conditioned liquor is returned via a conduit 40 to the equalization tank 12 of the system. The dechlorination of the thermally conditioned liquor protects biological organisms in the downstream treatment system.

EXAMPLE

A municipal wastewater treatment plant treating 2.5 million gallons per day (MGD) of raw wastewater also accepts sludge, septage and leachate from outside sources. The thermal conditioning of primary sludge from the system produces a 50 gallon per minute (GPM) recycle stream of thermally conditioned liquor and sludge which caused the plant to exceed its discharge limit for effluent color. Attempts to remove color from the liquor with hydrogen peroxide were not successful, however, chlorine from sodium hypochlorite did show promise. With chlorine gas in use for disinfection of the final plant effluent, a chlorine gas line was installed to deliver chlorine to the thermally conditioned liquor line as depicted in the Figure. The chlorine delivery system includes a chlorine cylinder fitted with a gas regulator which admits chlorine gas to a conduit connected to a chlorine injector, a type of water aspirator. Water flowing through the injector draws chlorine gas from the conduit into the injector where it mixes with the flowing water. This apparatus for chlorinating water is well known in the water and wastewater treatment industry. An alternative source for chlorine is sodium hypochlorite which is commercially available but is more expensive than chlorine gas. The chlorine/water mixture is directed into the thermally conditioned liquor line where decolorizing occurs. After treatment with chlorine, the treated liquor mixes with liquid from the solids dewatering means to remove any chlorine residual. The resulting liquor mixture is returned to the equalization tank for further treatment by the system.

During the five month test period, the 50 GPM thermally conditioned liquor was treated with chlorine doses ranging from 250 to 430 mg/l. The untreated liquor color ranged from 2,500 to 6,000 APHA color units. This treatment resulted in 20 to 70 percent color removal from the liquor. The chlorine residual in the treated liquor ranged from 5 to 120 mg/l over the test period.

Over the five month test period the untreated liquor averaged 4217 APHA color units while the treated liquor averaged 2294 APHA color units, a 45.7 percent reduction in color. The average chlorine dose was 383 mg/l with a 43 mg/l chlorine residual present prior to mixing with additional liquid from the dewatering operation.

I claim:

1. A process for removal of color and oxidizable matter from thermally conditioned sludge liquor comprising the steps;
   a) contacting said liquor with a chlorine dose from a chlorine source to remove a substantial amount of color matter and oxidizable matter therefrom, to produce a chlorine-treated liquor with chlorine residual therein;
   b) mixing said chlorine-treated liquor with additional untreated liquor to remove said chlorine residual therefrom, and produce a dechlorinated liquor mixture; and
   c) returning said dechlorinated liquor mixture to a wastewater treatment system for further treatment.

2. A process according to claim 1 wherein said thermally conditioned sludge liquor has color in the range of 2,000 to 7,000 APHA color units.

3. A process according to claim 1 wherein said chlorine dose is about 250 to 430 mg/l of thermally conditioned sludge liquor.

4. A process according to claim 1 wherein said chlorine source is gaseous chlorine.

5. A process according to claim 1 wherein said chlorine source is sodium hypochlorite.

6. A process according to claim 1 wherein said chlorine residual in said chlorine-treated liquor is about 5 to 120 mg/l.

7. A process according to claim 1 wherein said amount of color matter removed as about 20 to about 70 percent of influent level.

* * * * *